R. Gibbs,
Plow.
No. 107,037. Patented Sep. 6, 1870.
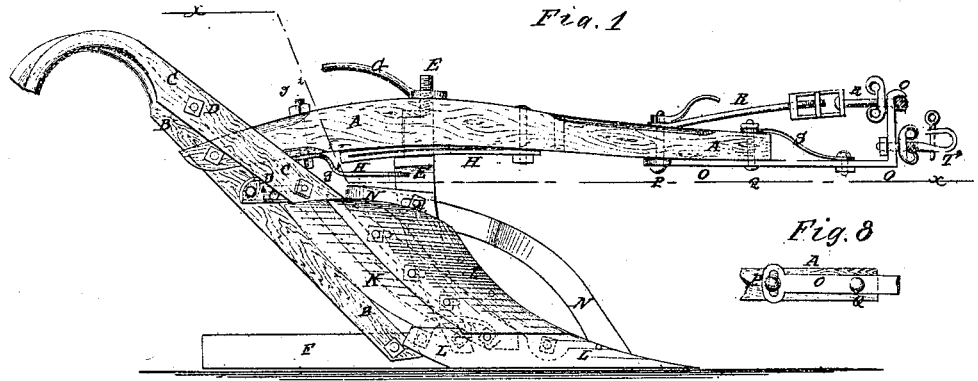
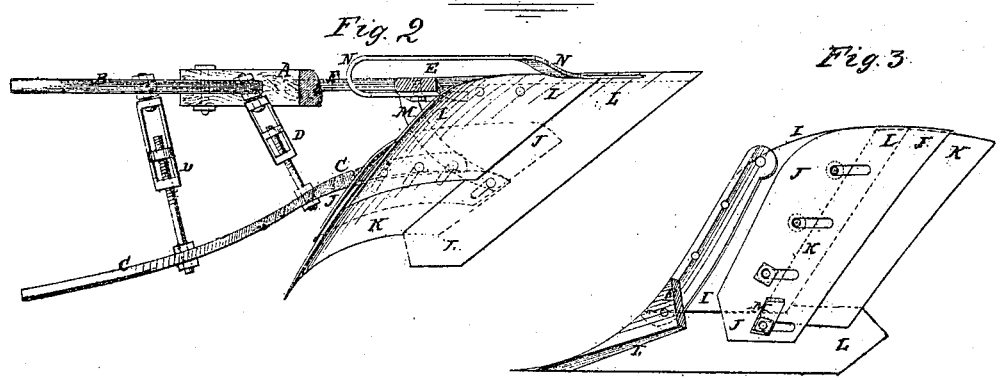
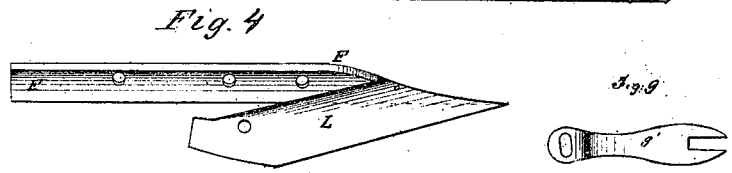
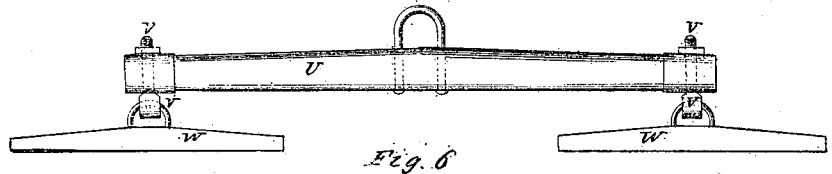
Witnesses:
A. W. Almquist
G. S. Mabee
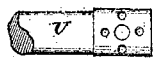
Inventor:
Rob't Gibbs
per
Attorneys

UNITED STATES PATENT OFFICE.

ROBERT GIBBS, OF BRUNSWICK, MISSOURI.

IMPROVEMENT IN PLOWS.

Specification forming part of Letters Patent No. 107,037, dated September 6, 1870.

*To all whom it may concern:*

Be it known that I, ROBERT GIBBS, of Brunswick, in the county of Chariton and State of Missouri, have invented a new and useful Improvement in Plows; and I do hereby declare that the following is a full, clear, and exact description thereof, which will enable others skilled in the art to make and use the same, reference being had to the accompanying drawings, forming part of this specification.

Figure 1 is a side view of my improved plow. Fig. 2 is a top view of the same, partly in section, through the line $x\,x$, Fig. 1. Fig. 3 is a detail view of the inner side of the adjustable mold-board. Fig. 4 is a detail perspective view of the smaller share and landside. Fig. 5 is a top view of the double-tree and whiffletrees. Fig. 6 is a detail front view of one end of the double-tree, the hook and whiffletree being removed. Fig. 7 is an end view of the same. Fig. 8 is an under side view of the clevis and end of the plow beam. Fig. 9 is a top view of the standard brace.

Similar letters of reference indicate corresponding parts.

My invention has for its object to furnish an improved plow which shall be simple in construction and effective in operation, being so constructed that it may be easily adjusted to cut a wide or narrow furrow or to run deep or shallow in the ground, as may be desired; and it consists in the construction and combination of the various parts of the machine, as hereinafter more fully described.

A is the plow-beam, to the rear end of which is securely attached the middle part of the landside-handle B, the lower end of which is attached to the landside end of the plow.

C is the mold-board handle, which is securely bolted to the mold-board.

The handles B C are connected to each other by the rods D, each of which is made in two parts, connected to each other by a long swiveled or right-and-left screw-nut, so that by turning the said nut the handles may be adjusted nearer together or farther apart, as may be desired, to give the plow less or more "land," as may be desired, and to stiffen the plow-frame.

E is the standard, to the lower end of which is securely bolted the landside F. The upper end of the standard E passes up through the beam A and is secured in place by a hand or lever nut, G.

$g'$ is a brace, the forward end of which is slotted to receive the standard E, to hold the standard and beam steady and keep them securely in place. The rear end of the brace $g'$ extends rearward and upward and is secured to the under side of the beam A by a bolt, $g^2$, which passes through said beam and through a transverse slot in the rear end of the said brace $g'$, as shown in Fig. 9. This construction allows the standard E to move up and down freely in adjusting the plow to run deeper or shallower in the ground, and by loosening the nut upon the bolt $g^2$ the beam may be adjusted to cause the plow to take less or more land, as may be desired.

H is a spring attached to the under side of the beam A and interposed between said beam A and a shoulder formed upon the said standard E, so as, when the nut G is loosened, to raise the beam A, depressing the plow-point and causing the plow to run deeper in the ground.

I J K is the mold-board of the plow, which is made in three parts. The part I is stationary, and is bolted at its inner or landside edge to the landside F and standard E. The inner or rear part, J, is slotted for the passage of the bolts that secure the handles C to the mold-board, so that by loosening the nuts of said bolts the said part J may be moved in or out, as desired. The inner edge of the third part, K, is inserted between the outer edges of the two parts I and J and is securely clamped in place by tightening the nuts of the said bolts.

L is the share, which is securely attached to or formed solid with the forward end of the landside F, and which is further secured and supported in place by being bolted to the outer end of the brace M, the other or inner end of which is bolted to the landside F. The outer or mold-board end of the shares L L' is parallel or in line with the front or landside end, so that when the edge of said share wears the share may still cut a furrow of the same width as before.

To adjust the plow for cutting a narrow furrow, the part K of the mold-board is removed and the part J pushed inward, so that its outer edge will not project beyond the outer edge of the part I. The share and mold-board are then removed and replaced with a smaller set, (shown in Fig. 4,) reducing the plow from a two-horse to a one-horse plow.

N is the cutter, the lower end of which is connected with and held in place upon the share L and forward edge of the landside F by a small dowel-pin, which enters a hole in the said parts, as shown in Fig. 1. The lower or cutting part of the cutter L is inclined rearwardly in a vertical plane. Its upper part is bent slightly outward or toward the unplowed land and extends back to the rear of the standard E. Its upper end is then bent inward and forward and is bolted to the upper part of the standard E. This construction of the cutter N leaves a space between the land side of said standard and the said cutter and effectually prevents the plow from becoming choked with grass, weeds, or other rubbish.

O is the draft or clevis bar, which is secured to forward end of the beam A by two bolts, P Q, the rear one, P, of which passes through a cross-slot in the enlarged rear end of said bar, to enable the forward end of said bar to be moved from or toward the unplowed land, as may be desired. The forward part of the clevis-bar O is bent upward at right angles, and its upper end is slotted and is bent forward or flanged, as shown in Fig. 1, to receive the head or nut of the brace-rod R. The rear end of the brace R extends back along the upper side of the beam A and is secured by the bolt P, which passes through a hole formed in its end. The brace R is made in two parts, connected to each other by a swiveled or right-and-left nut, as shown in Fig. 1, to enable the said brace to be shortened and lengthened, as may be required. This adjustment is necessary when the clevis-bar is reversed, which requires the said bar to be slightly lengthened. The forward end of the brace R is secured in place in the upper end of the bar O by a hand or jam nut, as shown in Fig. 1. The clevis is further strengthened by a brace, S, the forward end of which is bolted to the forward part of the bar O, and the rear end of which is held by the bolt Q.

T is the draft-hook, the shank of which is inserted in one or the other of the holes in the upright part of the bar O, where it is secured in place in any desired position by two hand or jam nuts screwed upon it, one upon each side of the bar O. The hook T, which receives the staple of the double-tree U, is made flat, so that it may hold the said double-tree in a horizontal position, and so that any change in the position of the double-tree will produce a corresponding change in the position of the plow, enabling the plow to be guided and controlled by the team, so that any one that can guide the team can use the plow. I will now proceed to describe the plan best adapted to.

V are the hooks that receive the whiffletrees W, which are also made flat, and the shanks of which pass through holes in the ends of the double-tree, where they are secured in place by nuts, as shown in Fig. 5. The ends of the double-tree are strengthened by ferrules or bands having holes or depressions formed in their forward sides to receive the points of the hooks V to hold the said hooks securely in place. This construction enables the hooks to be adjusted in any desired position. Thus by turning the point of one hook toward the end of the double-tree and the point of the other hook toward the center of the double-tree the arms of the said double-tree will be made slightly unequal in length. In such case the staples of the whiffletrees may require to be turned or arranged at such an angle as to allow said whiffletrees to retain their horizontal position.

Having thus described my invention, I claim as new and desire to secure by Letters Patent—

1. The adjustable mold-board I J K, made in three parts, constructed and connected with each other and with the frame-work of the plow, substantially as herein shown and described, and for the purpose set forth.

2. The interchangeable share L and landside F F', constructed and detachably connected with the adjustable mold-board I J K, standard E, and mold-board handle C, substantially as herein shown and described, and for the purpose set forth.

3. The cutter N, constructed and connected with the share, landside, and standard of the plow, substantially as herein shown and described, and for the purpose set forth.

4. The arrangement of the adjustable extension-rods H, with the standard E and beam A, as shown and described.

5. The draft device or clevis O P Q R S T, constructed, substantially as herein shown and described, to enable the point of draft attachment to be adjusted at will, as set forth.

6. The spring H, in combination with the beam A, standard E, and nut G, substantially as herein shown and described, and for the purpose set forth.

7. The adjustable brace $g'$, slotted longitudinally in its forward end and transversely in its rear end, in combination with the adjustable standard E and beam A, substantially as herein shown and described, and for the purpose set forth.

8. The shares L L', constructed substantially as herein shown and described—that is to say, with the line of its outer or moldboard end parallel with its front or landside end, substantially as herein shown and described, and for the purpose set forth.

ROBERT GIBBS.

Witnesses:
GEORGE W. MABEE,
JAMES T. GRAHAM.